Patented Jan. 13, 1953

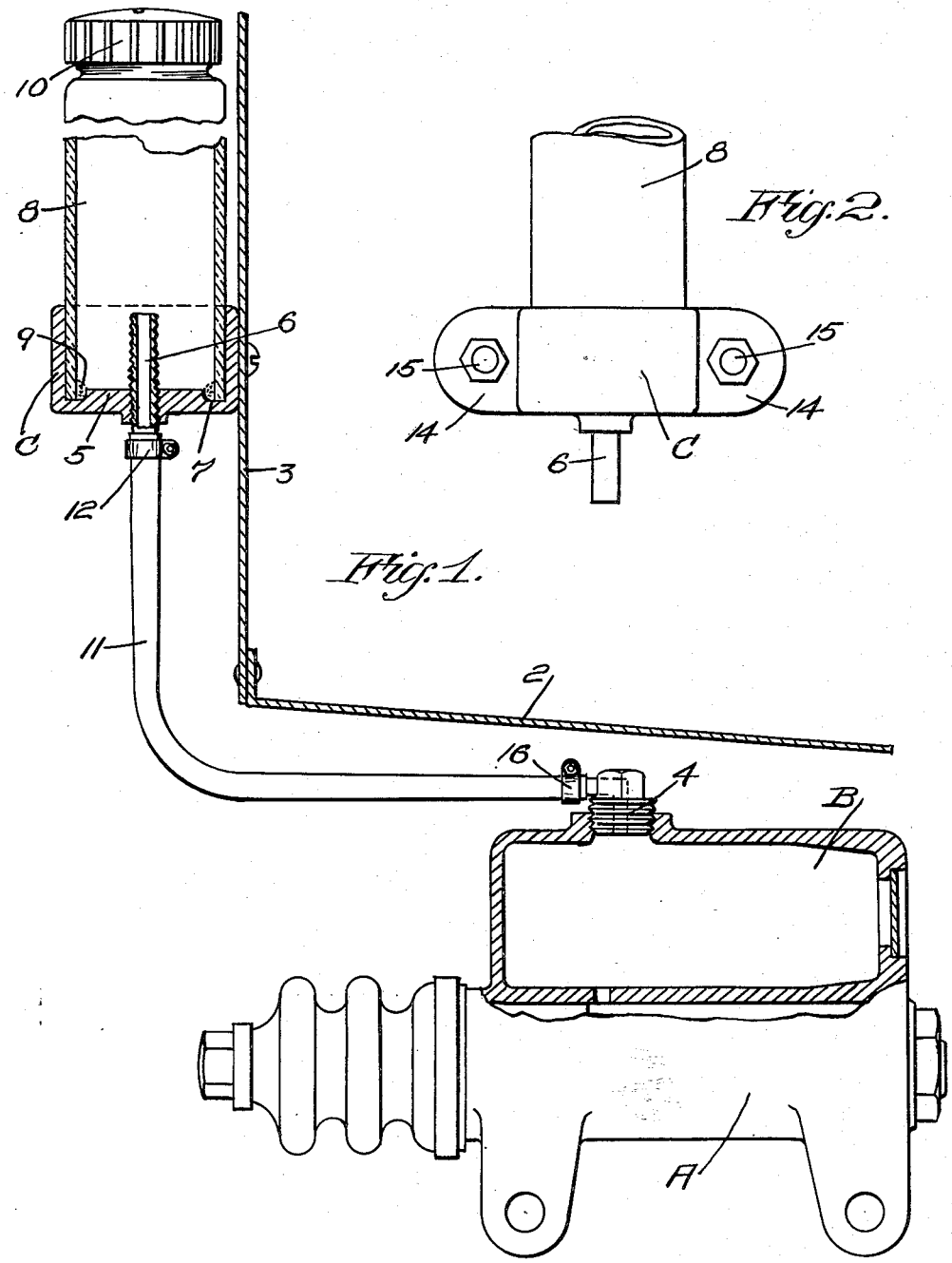

2,625,267

UNITED STATES PATENT OFFICE 2,625,267

SUPPLEMENTARY BRAKE FLUID RESERVOIR

Tom S. Alexander, Soquel, Calif.

Application May 29, 1950, Serial No. 165,030

1 Claim. (Cl. 210—57)

This invention relates to hydraulic brakes such as used on automobiles and like vehicles, and especially to means for visibly indicating and maintaining a surplus of actuating fluid to compensate for leakage and other losses of the fluid.

Automobiles and like vehicles which are equipped with hydraulic brakes employ a master cylinder and four or more brake cylinders one for each wheel. The master cylinder is provided with a piston which is actuated by a brake pedal, and when this is depressed, pressure on the fluid in front of the piston is raised and imparted to actuate the brake cylinders. The pressure produced is very considerable and fluid is gradually lost by leakage particularly after a certain amount of wear has taken place. To compensate for such fluid loss, the master cylinder is provided with a reservoir which automatically replaces leakage loss, but in time the reservoir becomes empty, and when this happens the brakes fail. The reservoir should of course be refilled from time to time, but as the filling opening of the reservoir is closed by a screw plug which is difficult to remove due to inaccessibility, and as no means is provided for indicating the fluid level in the reservoir, brake failure and an accident may be the result. There would be little wear and leakage loss in the hydraulic brake system, if dirt and dust could be excluded, but due to the fact that the master cylinder together with its reservoir is usually positioned below or in under the floor board where it is difficult to reach the screw plug and where the exterior surfaces including the screw plug become coated with dirt and mud, it is obvious that some dirt particles will enter the reservoir through the filling opening when the screw plug is removed.

The object of the present invention is to provide a supplementary reservoir which feeds brake fluid by gravity to the reservoir of the master cylinder; to provide a supplemental reservoir which visibly indicates the fluid level therein; to provide supplementary reservoir which may be readily secured to the fire wall of an automobile under the engine hood, so that whenever the hood is raised for servicing the engine, the supplementary reservoir will be in plain view where its fluid content may be noted, and further to provide a supplementary reservoir which is readily accessible for refilling and which is provided with a trap to prevent dirt or any other foreign matter from entering the fluid system of the master cylinder and the connected brake cylinders.

The invention is shown by way of illustration in the accompanying drawings, in which, Fig. 1 is a side elevation partially in section showing the supplementary reservoir and the manner in which it is connected to the reservoir of the master cylinder; and Fig. 2 is a front view of the cup member and a portion of the supplementary reservoir carried thereby.

Referring to the drawings in detail and particularly to Fig. 1, A indicates the master cylinder and B the reservoir with which most master cylinders are provided. The master cylinder is usually positioned below the floor section 2 of an automobile and below the fire wall 3, in other words, in a position which is both awkward and difficult to reach when the screw plug 4 with which the reservoir is provided is to be removed when refilling the reservoir. Furthermore, the cylinder and associated reservoir is in a position where it becomes covered with dirt and oil, particles of which are liable to drop through the filling opening of the reservoir when the screw plug is removed. Dirt of this character will obviously enter the master cylinder and other parts of the hydraulic system will cause rapid wear, excessive leakage and brake failure.

The present invention provides a supplementary reservoir which is mounted on the front face of the fire wall in a position where it is readily accessible, and where visible indication of the amount of fluid in the brake system may be had. The supplementary reservoir comprises a cup shaped member C open at the upper end and provided with a bottom section 5 in which is secured a tube 6. An annular groove 7 is formed in the bottom section to form a seat to receive the lower end of a glass bottle 8 from which the bottom has been removed by sawing off the bottom or otherwise, also the groove serves as a receptacle for a cementitious medium as indicated at 9 to seal and secure the bottle in the cup shaped member. The upper end of the bottle is provided with a screw cap 10 which is removed whenever the bottle is to be filled, and this cap when replaced obviously excludes dust and grit.

The tube 6 serves three functions, first, that of a duct to permit the brake fluid in the bottle to flow through a rubber or like tube 11 which is connected with the screw plug 4 of the master cylinder reservoir. Secondly, it will be noted that tube 6 extends an inch or more above the bottom section of the cup shaped member and as such acts as a trap to prevent dirt or other foreign matter from escaping, that is, if during removal of the screw cap any particle of dirt should enter the bottle such material would settle to the bottom, and only clean, clear fluid would be delivered to the reservoir of the master cylinder. Third, tube 6 also functions as a connection for the rubber tubing and a clamp 12 which secures the rubber tubing in place.

The cup shaped member C together with the bottle 8 forms the supplementary reservoir, and while said reservoir may be placed wherever convenient, I prefer to secure the same to the fire wall. To accomplish this, a pair of perforated lugs 14 are formed on the cup shaped member, hence, by perforating the fire wall at the place where it is desired to secure the supplementary reservoir and applying a pair of screws or bolts as indicated at 15, the work of mounting and securing the supplementary reservoir is finished, then by connecting the rubber tube to the screw plug 4 and applying a clamp 16 the entire installation is completed.

The supplementary reservoir when secured to the fire wall of an automobile besides being conveniently positioned for refilling serves a number of important functions. First of all, it is in plain sight where it may be looked at and the fluid content noted every time the engine hood is raised, hence, little chance of running out of brake fluid. Secondly, the supplementary reservoir serves as a dirt trap and thereby insures fluid delivery to the reservoir of the master cylinder which is free of grit and any other foreign matter. Third, if it is noted that the fluid level in the supplementary reservoir drops too rapidly, or in other words needs refilling too often, it serves as a warning that the hydraulic brake system is leaking badly and requires attention and possible overhaul.

It is well known that the tires of an automobile will at some times pick up and throw rocks with considerable force. It has happened that rocks thus thrown have damaged one or another of the flexible tubes which connects the master cylinder with the brake cylinder to such an extent as to start a leak of sufficient size to render the brakes inoperative in a comparatively short time. With the supplementary supply on hand, that is, the quantity of fluid in the supplementary reservoir and the rubber tubing the time before the brakes become inoperative is lengthened and may be sufficient to carry a person to the nearest garage or place where repair can be made.

Having thus described my invention, what I claim and desire to secure by Letters Patent is:

A device of the character described comprising a cup-shaped member, said member having a bottom section with an annular groove formed therein to receive the lower end of a bottle from which the bottom has been removed, said annular groove also adapted to receive a cementitious sealing medium to seal the bottle with relation with the cup-shaped member and to retain the bottle against the removal from the cup-shaped member, a tube extending through and secured in the bottom of the cup-shaped member, said tube projecting above the bottom and into the bottle a sufficient distance to form a dirt trap and said tube extending below the bottom of the cup-shaped member a sufficient distance to receive a rubber tube and a clamp to secure the rubber tube against removal, and a pair of lugs formed on the cup-shaped member, said lugs being perforated to receive bolts whereby the cup-shaped member may be secured to a suitable support.

TOM S. ALEXANDER.

REFERENCES CITED

The following references are of record in the file of this patent:

UNITED STATES PATENTS

| Number | Name | Date |
| --- | --- | --- |
| 1,106,352 | Adair | Aug. 4, 1914 |
| 1,333,197 | Arzinger | Mar. 9, 1920 |
| 1,468,906 | Inman | Sept. 25, 1923 |
| 1,496,713 | Kuhn et al. | June 3, 1924 |
| 1,770,064 | Carroll | July 8, 1930 |
| 2,166,724 | Loweke | July 18, 1939 |
| 2,205,336 | Beach | June 18, 1940 |
| 2,512,156 | Hoffman | June 20, 1950 |

FOREIGN PATENTS

| Number | Country | Date |
| --- | --- | --- |
| 216,562 | Germany | Nov. 14, 1909 |